Oct. 23, 1962

C. S. SCHROEDER 3,059,795

TRACTOR-TRAILER TRUCK

Filed Dec. 17, 1959

INVENTOR.
CHARLES S. SCHROEDER
BY
*A. H. Golden*
ATTORNEY

Oct. 23, 1962 C. S. SCHROEDER 3,059,795
TRACTOR-TRAILER TRUCK
Filed Dec. 17, 1959 3 Sheets-Sheet 2

INVENTOR.
CHARLES S. SCHROEDER
BY
*J. H. Golden*
ATTORNEY

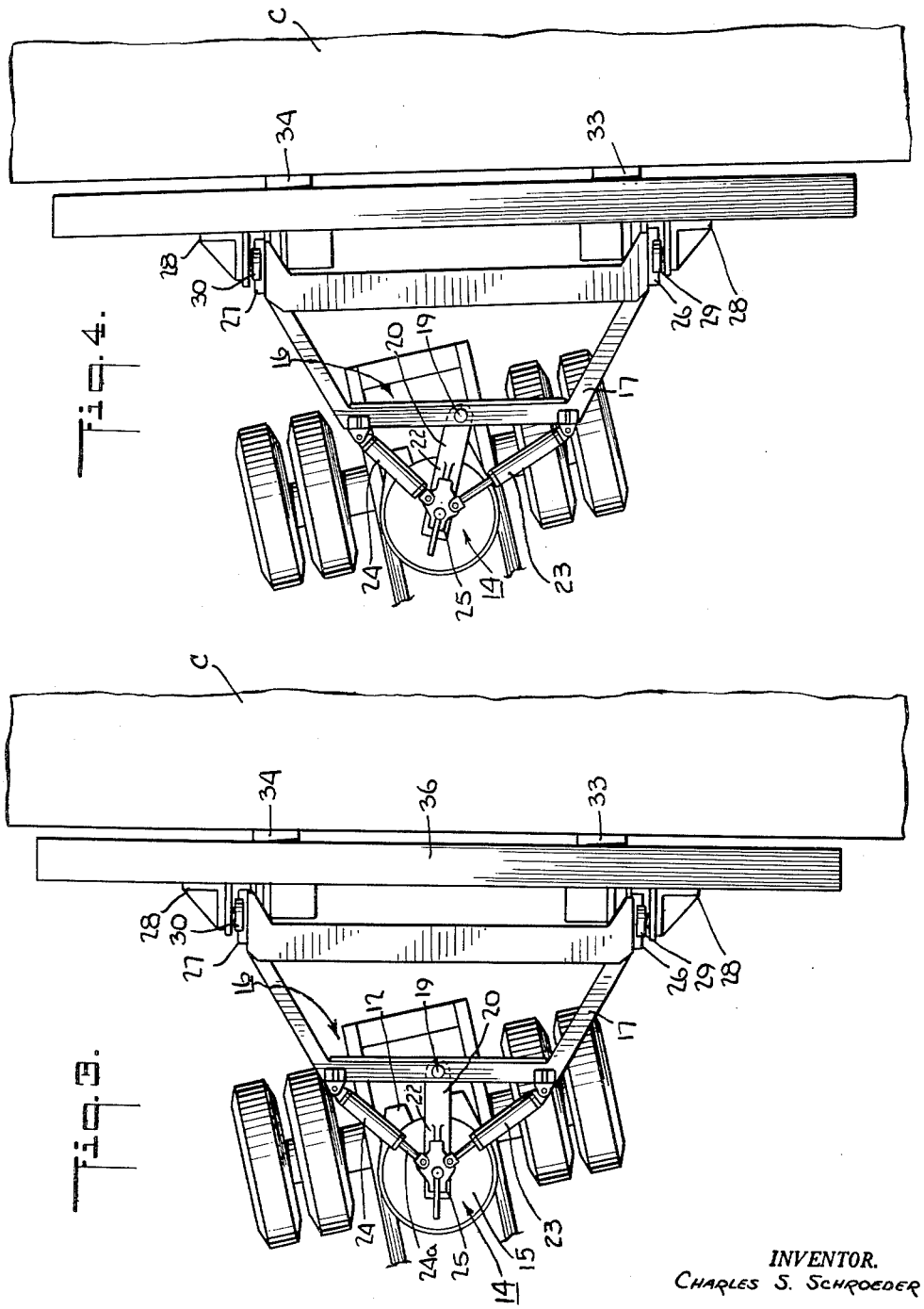

United States Patent Office 3,059,795
Patented Oct. 23, 1962

3,059,795
TRACTOR-TRAILER TRUCK
Charles S. Schroeder, Villanova, Pa., assignor to The Yale and Towne Manufacturing Company, Stamford, Conn., a corporation of Connecticut
Filed Dec. 17, 1959, Ser. No. 860,209
4 Claims. (Cl. 214—730)

This invention relates to a tractor-trailer truck of a type in which the front end of the trailer is pivotally supported on the rear end of the tractor by a fifth wheel connection.

In order to align or otherwise orient the rear end of the trailer of a conventional truck of this type with a loading platform, railway car, or the like it is necessary to maneuver the trailer into the desired position by operation of the tractor. Where the space for operating the tractor is limited and the tractor must be accurately spotted or oriented it may be necessary to operate the tractor alternately in the forward and reverse directions many times while constantly manipulating the steering wheel of the tractor to change the angle between the tractor and the trailer so as to steer the trailer in the proper direction during rearward movement. Such maneuvering of the trailer to obtain the desired orientation by operation of the tractor is necessarily time consuming and tedious.

The present invention provides a tractor-trailer truck construction whereby the angular position of the trailer relatively to the tractor may be quickly changed by swinging the trailer relatively to the tractor without movement or operation of the tractor. Thus, the trailer may be roughly spotted relatively to a loading platform, railway car, or the like by operation of the tractor in the conventional manner, and the trailer then quickly and accurately spotted by swinging the trailer relatively to the tractor to obtain the desired orientation of the trailer without further operation or movement of the truck.

In accordance with the invention, the connecting structure of the trailer for connecting the trailer to the fifth wheel of the tractor is formed in two parts pivotally connected together. One part forms a portion of the trailer, while the other part is adapted to be pivotally connected to the fifth wheel of the tractor. Ram means are secured between the two parts. During normal operation of the truck the ram means serve to hold the two parts against pivotal movement relatively to one another so that the two parts function as an integral unit and the trailer may be maneuvered in the conventional manner by operation of the tractor. When it is desired to accurately spot or orient the trailer, the ram means are operated to effect pivotal movement between the two parts to thereby swing the trailer relatively to the tractor to obtain the desired orientation of the trailer without operation of the tractor.

While the invention may be advantageously applied to various types of tractor and trailer trucks, the invention is particularly useful in tractor-trailer trucks in which the trailer incorporates a lifting arrangement for elevating and laterally moving large containers, and the invention is described hereafter by reference to such a truck.

It is quite common for manufacturers of various products to ship their products in very large containers, comparable in size to that of highway cargo trailers. Such containers are loaded at the factory and carried throughout the country on railway flat cars. The use of a truck constructed in accordance with the present invention and incorporating a lifting mechanism permits such containers to be quickly and accurately spotted on the railway flat cars.

In spotting the container on the flat car, the container is elevated above the surface of the car and the trailer backed up until the wheels and frame of the trailer extend under the flat car and the container is spotted roughly over the flat car. The container is then accurately aligned longitudinally of the flat car by operation of the ram means of the invention and lowered on to the flat car.

The invention having been broadly described a more detailed description of one embodiment is given hereafter by reference to the accompanying drawings wherein.

Figure 1:
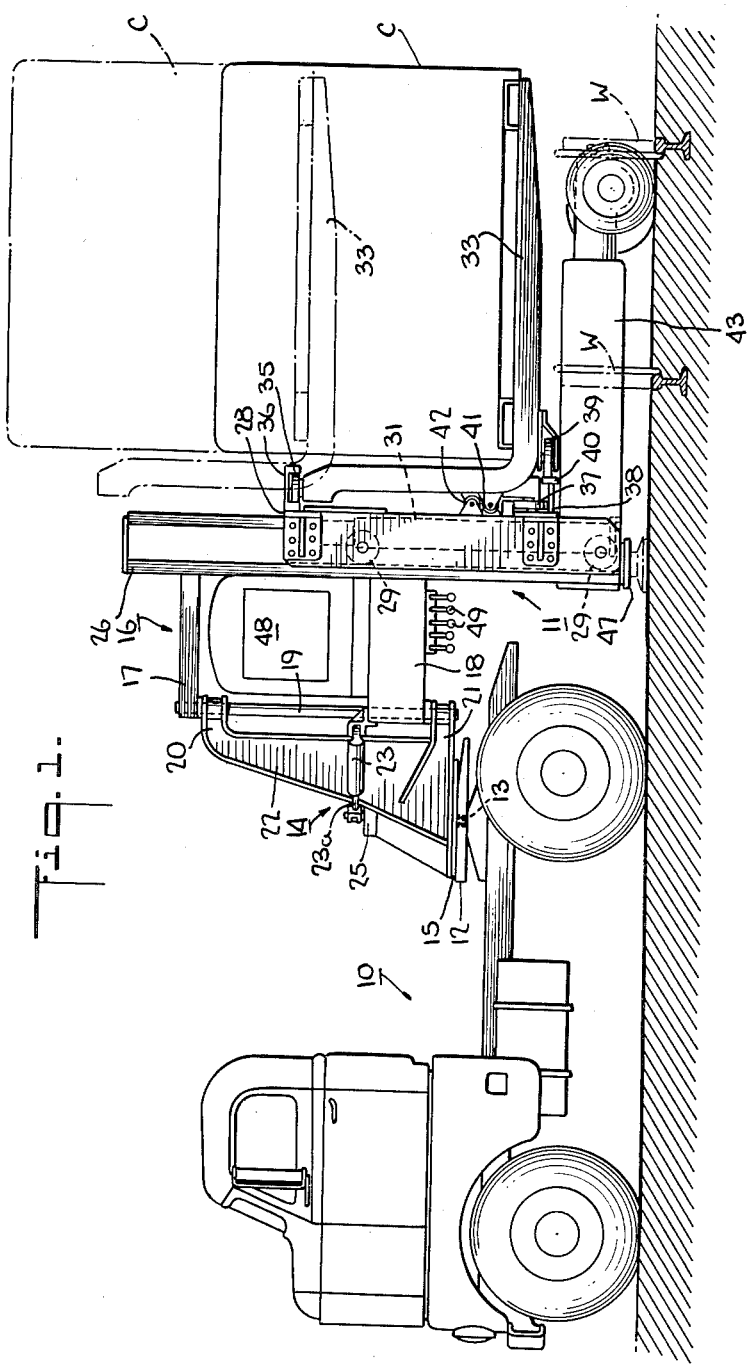
FIG. 1 is a side elevational view of a truck constructed in accordance with the present invention showing the truck backed over a railway track preparatory to placing a large container on a railway flat car.

FIG. 3 is a partial plan view of the truck of FIG. 1 showing the ram means of the invention in centered position holding the two parts of the connecting structure against relative pivotal movement so that the two parts function as an integral unit, and the trailer may be maneuvered in the conventional manner by operation of the tractor, and FIG. 4 is a partial plan view of the truck showing the ram means operated to effect relative pivotal movement between the connecting parts of the trailer to swing the trailer relatively to the tractor to accurately spot a load carried thereby relatively to a flat car, or the like, without operation or movement of the tractor.

Referring to the drawings, and in particular to FIG. 1, the tractor is generally designated by the reference numeral 10, and the trailer is generally designated by the reference numeral 11.

The tractor 10 is of conventional construction and includes a fifth wheel 12 which is adapted to receive a conventional pivot pin 13 secured to the trailer 11, whereby the trailer is secured to the tractor for pivotal movement relatively to the tractor in the conventional manner.

Figure 2:
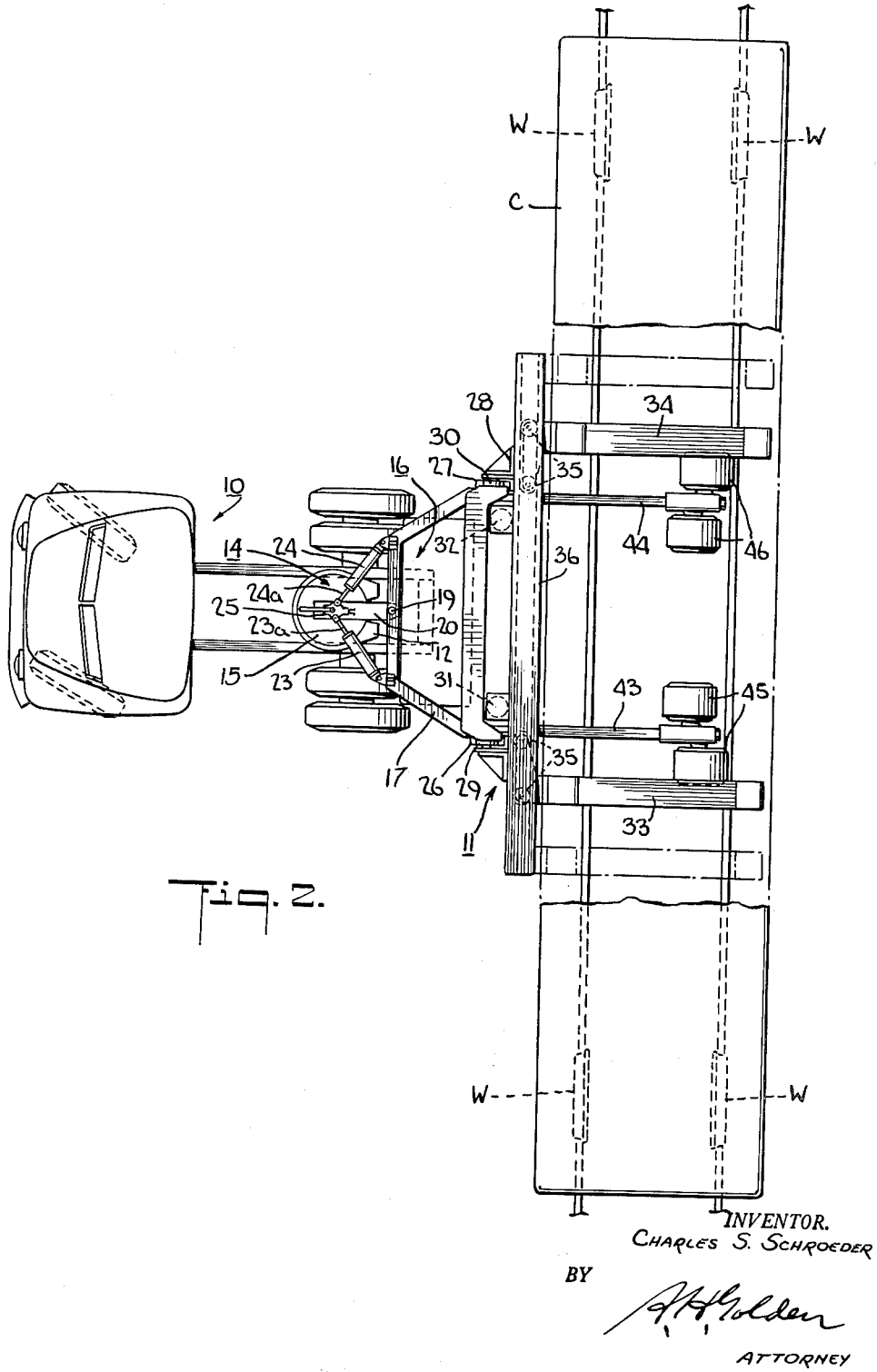
FIG. 2 is a top plan view of the truck shown in FIG. 1.

In accordance with the invention the connecting structure of the trailer is formed of two parts pivotally connected together. As best shown in FIGS. 1 and 2, one part, generally designated by the reference numeral 14, includes a bearing plate 15 to which the pivot pin 13 is secured, and is therefore adapted to be pivotally connected to the fifth wheel 12 by means of the pivot pin 13. The other part, generally designated by reference numeral 16, includes upper and lower frame work members 17 and 18 which form an integral part of the remainder of the trailer.

The two parts 14 and 16 are pivotally connected together by a vertically extending pin or shaft 19 which extends through center portions of the frame work members 17 and 18 and is suitably journalled for rotation in vertically spaced arms 20 and 21 of a vertically extending clevis member 22. The clevis member 22 is rigidly secured to the bearing plate 15 of the part 14. Thus the part 16 and the remainder of the trailer may be pivoted around the axis of the pin 19 relatively to the part 14, or may be pivoted with part 14 relatively to the tractor 10 around the axis of the pivot pin 13 if the parts 14 and 16 are locked together.

The parts 14 and 16 are adapted to be either locked together, or pivoted relatively to one another by a pair of rams 23 and 24. As shown in FIGS. 1 and 2, the rams 23 and 24 are pivotally connected to opposite sides of the lower frame member 18, and their piston rods 23a and 24a are pivotally secured to a reinforced plate 25 which is rigidly secured to the clevis member 22 and the bearing plate 15. By holding the rams 23 and 24 in center position, as shown in FIGS. 2 and 3, the parts 14 and 16 are locked together so that the parts 14 and 16 function as an integral unit and the trailer 11 may be maneuvered in the conventional manner by operation and movement of the tractor 10 to swing the trailer 11 around the pivot pin 13. When, however, it is desired to quickly and accurately spot or orient the trailer 11 relatively to a loading platform, railway car, or the like, the rams 23 and 24 may be operated to extend the piston rod of one ram and retract the piston rod of the other ram as shown in FIG. 4. This results in swinging the trailer to the right or left relatively to the tractor without operating or moving the tractor 10. Thus by first locking the rams 23 and 24 in center position, the trailer may be maneuvered into approximate position by operation and movement of the tractor in the conventional manner, and the trailer then accurately spotted by operation of the rams 23 and 24 to swing the trailer into the precise position desired.

When the truck is to be used in spotting large containers, or to otherwise manipulate large containers, the trailer may advantageously include a container lifting structure, as best shown in FIGS. 1 and 2.

Referring to FIGS. 1 and 2, the lifting structure is of a type used on conventional industrial trucks, and includes vertically extended channel uprights 26 and 27 on which a load carriage 28 is mounted for vertical movement by means of rollers 29 and 30 which extend into the channels of the uprights. The load carriage 28 is adapted to be elevated on the uprights 26 and 27 by means of rams 31 and 32 (FIG. 2) in the conventional manner.

A pair of load supporting forks 33 and 34 are mounted on the load carriage 28 for transverse movement relative to the load carriage by means of rollers 35 which are secured to the upper ends of the forks 33 and 34 and extend into an upper, transversely extending channel guide 36 which is secured to the load carriage 28, and by means of rollers 37 which are secured to the lower backside of the forks 33 and 34 and extend into a lower, transversely extending channel guide 38 secured to the load carriage 28. Rollers 39 secured to the underside of the forks 33 and 34 roll on a plate 40 secured to the lower guide 38, and accept the thrust between the forks 33 and 34 and the load carrier. The forks 33 and 34 are adapted to be adjusted transversely relatively to one another to vary the spacing there between, or to be moved simultaneously in the same direction to shift a load carried on the forks transversely of the trailer by means of rams 41 and 42. Ram 41 is secured at one end to fork 33 and at the other end to the load carriage 28. Ram 42 is secured at one end to fork 34 and at the other end to the load carriage 28.

The upper portions of the uprights 26 and 27 are rigidly secured to the upper and lower frame members 17 and 18, while the lower portions of the uprights 26 and 27 are rigidly secured to wheel supporting frame members 43 and 44 to form an integral trailer unit. Each of the frame members 43 and 44 has a pair of wheels 45 and 46 pivotally secured thereof for rocking movement about a longitudinal axis. Each wheel of each pair of wheels is staggered relatively to the other. By this arrangement, when the truck crosses a depressed railroad track, or the like, only one wheel of each pair of wheels drops into the depression at one time, thereby minimizing the shock to the trailer and to a load carried by the trailer. Jack means 46 are provided at each side of the trailer, and serve when lowered, as shown in the broken lines in FIG. 1, to support the front end of the trailer 11 when the trailer is disconnected from the tractor 10.

Fluid for operating the various rams is supplied from a pump (not shown) which is driven by an engine 48. The engine 48 is conveniently supported on and secured to the lower frame member 18. Manual controls 49 for operating each of the various rams are mounted for easy accessibility on the underside of the lower frame work member 18, as shown in FIG. 1.

In utilizing the trailer to spot a large container, such as indicated at C in the drawings, on a railway flat car, the truck, with the container supported on the forks 33 and 34 in an elevated position, is backed up by operation of the tractor 10 in the conventional manner until the frame members 43 and 44 and wheels 45 and 46 extend under the flat car between the wheels W of the flat car and the container C is spotted roughly over the flat car. During such maneuvering the rams 23 and 24 are locked in center position thereby locking the parts 14 and 16 of the trailer 11 against relative pivotal movement around pin 19. After the container has been roughly spotted over the flat car, the container may be quickly and accurately aligned with the flat car in the longitudinal direction by engaging the brakes of the tractor 10 and operating the rams 23 and 24 to swing the trailer relatively to the tractor 10 and to the flat car. After alignment of the container with the flat car, the container may be accurately positioned longitudinally of the flat car by operation of the rams 41 and 42 to shift the forks 33 and 34 transversely of the trailer the necessary amount. Once accurately spotted over the flat car, the container may be lowered on to the flat car by operation of the rams 31 and 32.

From the preceding description it can be seen that there is provided a novel tractor-trailer construction whereby the trailer may be quickly and accurately spotted or oriented relatively to a load platform, railway car, or the like, without tedious and time consuming operation or movement of the tractor.

While one embodiment of the invention has been shown and described it is to be understood that this is for the purpose of illustration and that changes and modifications may be made therein without departing from the support and scope of the invention.

I now claim:

1. In a combination of the class described, a tractor having a fifth wheel pivot means, a trailer having rear load wheels, hitching means for said trailer comprising a member pivoted on a vertical axis at one point to the forward end of said trailer and pivoted on a vertical axis at another point on said fifth wheel pivot means, hydraulic ram means extending between and pivotally connected to said member and said trailer for holding said member against pivotal movement relatively to said trailer so that said trailer may normally be manipulated by said tractor as though said hitching means were an integral part of said trailer, and the admission of fluid into said hydraulic ram means pivoting said member and trailer relatively to one another for spotting said trailer without movement of said tractor.

2. In a combination of the class described, a tractor having a fifth wheel pivot means, a trailer having rear load wheels, hitching means for said trailer comprising a member pivoted on a vertical axis at one point to the forward end of said trailer and pivoted on a vertical axis at another point on said fifth wheel pivot means, a pair of hydraulic rams each extending between and pivotally connected to said member and said trailer for holding said member against pivotal movement relatively to said trailer so that said trailer may normally be manipulated by said tractor as though said hitching means were integral therewith, and the admission of fluid into said rams pivoting said member and trailer relatively to one another for spotting said trailer without movement of said tractor.

3. In a combination of the class described, a truck having a fifth wheel pivot means, a trailer having a frame, load wheels carried by said frame for supporting the rear end of the trailer, a load lifting mechanism secured to said frame for elevating a load above said frame whereby said frame and load wheels may be extended beneath a platform to extend a load carried by said load lifting mechanism above said platform, hitching means for said trailer comprising a member pivoted on a vertical axis at one point to the forward end of said trailer and pivoted on a vertical axis at another point on said fifth wheel pivot means, hydraulic ram means extending between and pivotally connected to said member and the trailer for holding said member against pivotal movement relatively to said trailer so that said trailer may normally be manipulated by said tractor as though said hitching means were an integral part of said trailer, and the admission of fluid into said hydraulic ram means pivoting said member and trailer relatively to one another for spotting said trailer without movement of said tractor.

4. In a combination of the class described, a truck having a fifth wheel pivot means, a trailer having a frame, load wheel carried by said frame for supporting the rear end of the trailer, a load lifting mechanism secured to said frame for elevating a load above said frame whereby said frame and load wheels may be extended beneath a platform to extend a load carried by said load lifting mechanism above said platform, said load lifting mechanism including means for shifting said load transversely of said trailer whereby to facilitate the spotting of a load relatively to said platform, hitching means for said trailer comprising a member pivoted on a vertical axis at one point to the forward end of said trailer and pivoted on a vertical axis at another point on said fifth wheel pivot means, hydraulic ram means extending between and pivotally connected to said member and the trailer for holding said member against pivotal movement relatively to said trailer so that said trailer may normally be manipulated by said tractor as though said hitching means were an integral part of said trailer, and the admission of fluid into said hydraulic ram means pivoting said member and trailer relatively to one another for spotting said trailer without movement of said tractor.

References Cited in the file of this patent

UNITED STATES PATENTS

| | | |
|---|---|---|
| 2,730,376 | Martin | Jan. 10, 1956 |
| 2,833,557 | Palmiter | May 6, 1958 |
| 2,896,734 | Toth | July 28, 1959 |

FOREIGN PATENTS

| | | |
|---|---|---|
| 90,019 | Norway | Sept. 16, 1957 |